June 22, 1926.  1,589,350

F. BERGTER

METHOD OF CONVERTING THE ENERGY TAKEN FROM HIGH TENSION
CONTINUOUS CURRENT SUPPLY MAINS INTO ALTERNATING CURRENT

Filed May 7, 1921  2 Sheets-Sheet 1

Patented June 22, 1926.

1,589,350

UNITED STATES PATENT OFFICE.

FRIEDRICH BERGTER, OF BERLIN-CHARLOTTENBURG, GERMANY, ASSIGNOR, BY MESNE ASSIGNMENTS, TO GENERAL ELECTRIC COMPANY, OF SCHENECTADY, NEW YORK, A CORPORATION OF NEW YORK.

METHOD OF CONVERTING THE ENERGY TAKEN FROM HIGH-TENSION CONTINUOUS-CURRENT-SUPPLY MAINS INTO ALTERNATING CURRENT.

Application filed May 7, 1921, Serial No. 467,678, and in Sweden January 22, 1921.

For the conversion into alternating current of continuous current energy transmitted over long distance lines at a high tension it is possible to employ highly evacuated discharge vessels with incandescent cathodes in conjunction with a transformer. Upon the grids of these discharge vessels fluctuating potentials are impressed in such a way that the energy taken by the discharge vessel from the continuous current mains is fed to the transformer in the form of pulsating continuous current and taken from the transformer as an alternating current.

In arrangements of this kind large losses of energy occur either in the discharge vessel or in the transformer; for if the continuous current is taken from the supply main in the form of sinusoidal fluctuations, which, as is well known, gives the best efficiency of the transformer, the discharge vessel itself will consume at least one half of the energy supplied from the mains.

This loss in the discharge vessel may be reduced to a very small amount if the sinusoidal form of discharge is departed from and its shape is made such that either the current or the voltage in the discharge vessel is very nearly zero during the major part of each period. This measure is known in the art of wireless telegraphy but would fail in the case under discussion, because the altered form of curve entails very great losses in the transformer.

By the present invention it is possible to reduce the loss of energy both in the discharge vessels and in the transformer to an extremely small amount and thus to obtain an efficiency of more than 90%. This is accomplished by producing by a number of discharge vessels a number of collateral currents of a wave form that gives small losses in the vessels, and in so uniting or superimposing the collateral currents in a transformer that a sinusoidal current results which is conducive of a high efficiency in the transformer.

Figure 1:
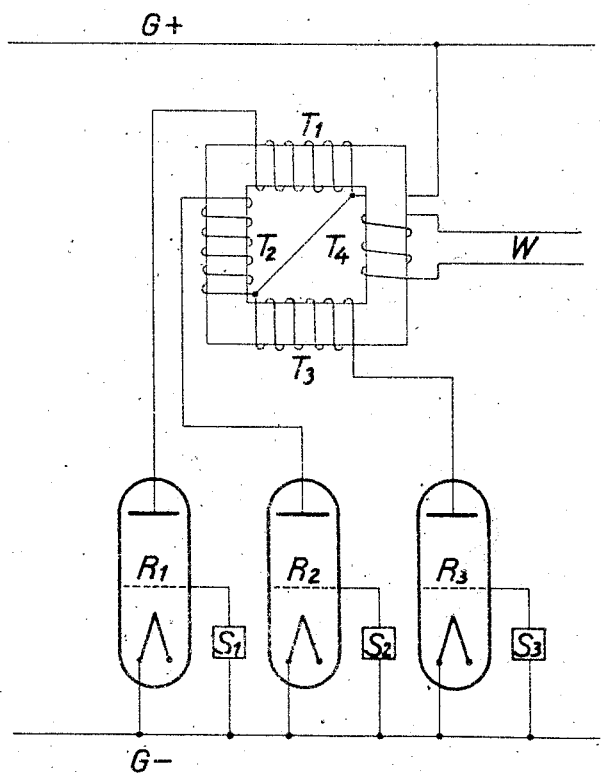
Figure 2:
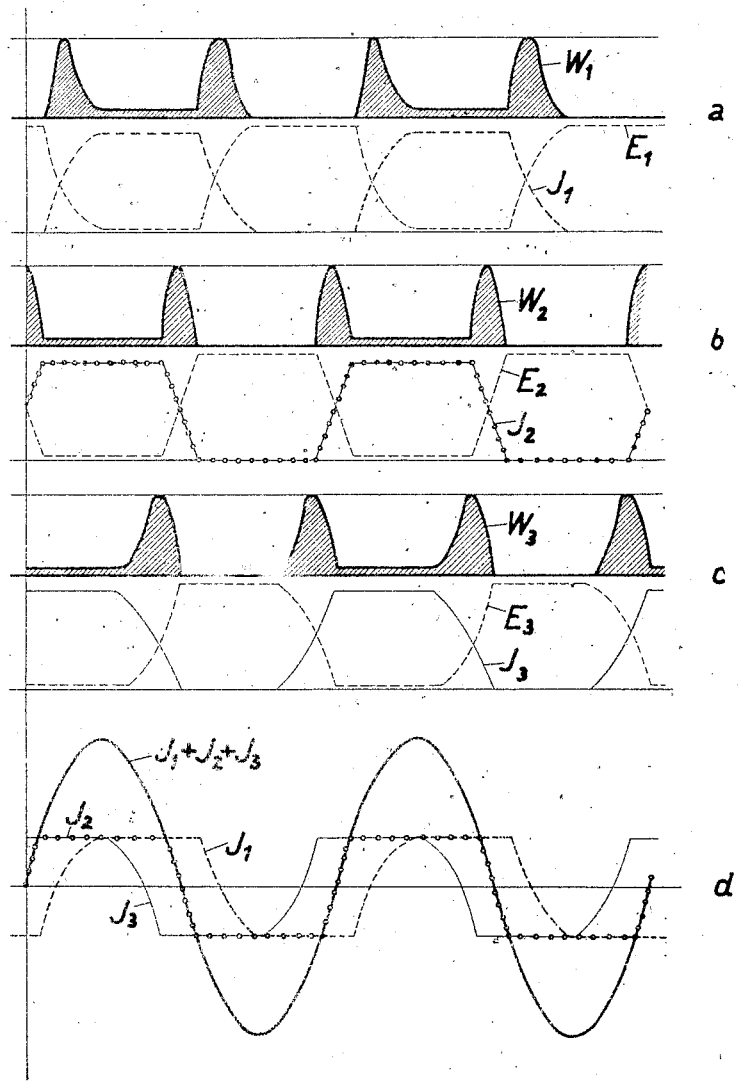

The invention is illustrated in the drawing in which Fig. 1 shows a circuit arrangement which may be used in cases in which three discharge vessels are employed, and Fig. 2 shows the wave forms of the collateral currents and of the sinusoidal current resulting from their unification in the transformer.

As will be seen from Fig. 1 each discharge vessel $R_1$, $R_2$ and $R_3$ is connected in series with a transformer coil $T_1$, $T_2$ and $T_3$ respectively. The continuous current supply leads G+ and G— are thus connected through the coils by three separate paths. The three coils are insulated from each other and arranged on the core of the transformer, upon which a fourth coil $T_4$ is placed from which the sinusoidal alternating current is taken that is supplied to the alternating current mains W. Separate sources of electric potential $S_1$, $S_2$ and $S_3$ deliver the different grid potentials whose periodic variations, in addition to the inductive reaction of the transformer, are the factors that determine the wave form of the currents and potentials delivered from the anodes of the discharge vessels. Any source or sources of variable E. M. F. of current such as an A. C. generator or generators of a simple type can be used for the sources $S_1$, $S_2$, $S_3$ (adjusting the magnetic poles of the generators for example, to effect the desired phase relationship).

Examples of preferred forms of current and potential curves, in cases where three discharge vessels are used as described, are shown in Fig. 2a–d. In all these figures E is the voltage, J the current and W the energy. Fig. 2a applies to the first discharge vessel $R_1$. It will be seen that at the moments in which the current values are high the potential is almost at zero, whilst at times when the potential is high the current values are insignificant. Hence the product of these two values, i. e. the loss of energy in the vessels, is very small during the greater part of the period, as will be seen by inspection of the curve W. The preferred wave forms given by the second and third evacuated tubes or discharge vessels are shown in Figures 2b and 2c. In Fig. 2d the superimposed collateral current waves and the curve resulting from the sum of the three collateral currents is represented. The latter curve is completely sinusoidal, i. e., its shape is such as to give rise to the smallest possible loss in the transformer.

Hence the described arrangement enables the energy supplied from the continuous current mains to be converted with a good efficiency into sinusoidal alternating current. The current is taken from the supply mains in the form of a pulsating continuous current that fluctuates between a maximum value and a lowest value almost equal to zero. If the energy is to be taken from the source of continuous current at a practically uniform rate, a plurality of the aforedescribed arrangements may be interconnected in such a way that the sum of the pulsating currents is practically constant at all times.

I claim:

The method of converting current from a D. C. source into alternating current without serious loss of energy which comprises supplying energy from said source through each of the multiple primary coils of an A. C. transformer and causing the energy from each of said coils to flow through a highly evacuated discharge vessel or tube to the other pole of the D. C. system, and varying the grid potential of each tube in relation to the impedance of the primary coil in that branch so as to produce in a single secondary coil inductively coupled to all of the primary coils a resultant sinusoidal current.

In testimony whereof I affix my signature.

FR. BERGTER